Sept. 2, 1969     J. VAN DEN BRINK     3,464,290
VIBRATION DAMPERS
Filed Aug. 14, 1967
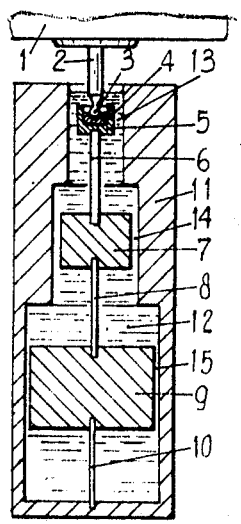
FIG.1
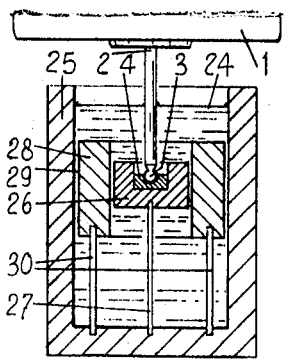
FIG.3
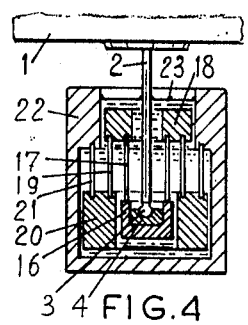
FIG.4
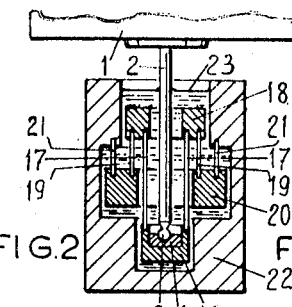
FIG.2    FIG.5
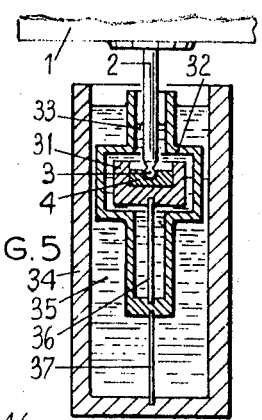
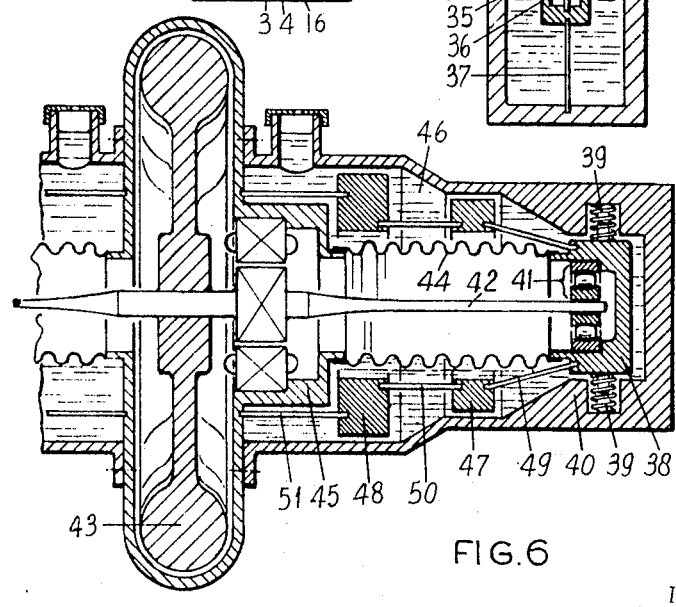
FIG.6
INVENTOR
Jan van den Brink
BY Cushman, Darby & Cushman
ATTORNEYS

United States Patent Office 3,464,290
Patented Sept. 2, 1969

3,464,290
VIBRATION DAMPERS
Jan van den Brink, Klarenburg, Netherlands, assignor to Reactor Centrum Nederland, The Hague, Netherlands, an institute organized under the laws of the Netherlands
Filed Aug. 14, 1967, Ser. No. 660,284
Claims priority, application Netherlands, Sept. 13, 1966, 6612858
Int. Cl. F16f *15/10;* G01c *19/20*
U.S. Cl. 74—574                  12 Claims

ABSTRACT OF THE DISCLOSURE

A vibration damping assembly for the shaft of a rotating body comprises a bearing for the shaft and a series of liquid-immersed damping members having different damping characteristics disposed on the axis of the shaft in a liquid-filled container. At least one of the members is supported from the container by a resilient connection which opposes radial vibration of the members, and the members of the series are yieldingly coupled to each other.

---

The invention relates to a vibration damper for a fast spinning body of revolution supported by one or more bearings, said damper comprising a container containing liquid and a damping member immersed in said liquid, said damping member being able to move in radial directions against a readjusting force in respect of the container and being coupled with the body of revolution through a bearing.

Vibration dampers of this kind which in the first place are used to damp the radial mechanical vibrations occurring in a fast spinning system, such as a turbine rotor, a gyroscope, an instrument comprising rotating mirrors, a centrifuge or like device can mostly be made optimally effective for a restricted frequency range only. However, within the starting period several numbers of revolutions or frequencies may be found at which the spinning system gets into vibration and which depend on the bearing or support, the construction, the shape and the operational speed of the spinning system. Such critical frequencies are, inter alia, caused by the bearing or support or by the mass and the rigidity of the spinning system and they can be distinguished in so-called bearing frequencies and whirl frequencies. The "whirl" is the vibration phenomenon occurring at a certain number of revolutions, at which the spinning system starts vibrate as a taut string in a plane containing the axis of rotation, said plane rotating about said axis with the whirl frequency. In connection therewith it is observed, that generally the whirl frequency does not correspond with the number of revolutions, at which the said vibration phenomenon occurs. The known vibration damper is not adapted to damp vibrations having frequencies which differ considerably from one another. To achieve such a damping the damping curve would have to be so flat that only a very restricted damping operation would be possible.

The invention has the object to provide a vibration damper of the mentioned kind which can be constructed in a simple way, such, that it has an optimally damping effect at each dangerous critical frequency occurring in the relevant spinning system. It consists in that at least one other damping member is provided in the said container or another liquid containing container of the damper, said other damping member being able to move in its container in radial directions against a force which counteracts the deviation of the member from its neutral position and being coupled with the first damping member by at least one resilient coupling member and/or a mass of liquid. In this vibration damper each part provided with a damping member can be constructed for damping a vibration with a predetermined frequency with optimal effect, so that the damper as a whole has a great damping action at all dangerous frequencies.

In order to avoid, in the vibration damper, interferences between the parts thereof which are each meant for another frequency range and are each provided with an individual damping member, a construction is recommended, in which said damper parts are adapted to work in ranges of higher frequencies in proportion as their damping members are more strongly coupled with the body of revolution. In this case the vibrations of critical frequencies are substantially transmitted to the relevent individual dampers, so that the effect of the damper is greatest.

The vibration damper made in accordance with the invention can be constructed in various ways and it is easily adapted to the construction of the apparatus comprising the spinning system. For instance, the damping members may be so mounted that their axial distances from the body of revolution are smaller in proportion as they are more strongly coupled with said body. Also the reversed construction is possible, in which the damping members are mounted, in such manner, that their axial distances from the body of revolution are greater in proportion as they are more strongly coupled with the body of revolution. In these dampers the axial dimension is rather great, since the damping members are mounted one next to or under the other in the axis of rotation.

A vibration damper which has at least three damping members and is relatively short in axial direction is obtained, when the damping members of at least one set of three directly consecutive damping members are mounted, in such a manner, that the axial distances between the first and the second damping member of said set on one hand and the body of revolution on the other hand are greater or smaller and the axial distances between the second and the third damping member of said set on one hand and said body on the other hand are smaller or greater, respectively, in proportion as said damping members are more strongly coupled with the body of revolution. In this construction the damping members of said series are, so to say, folded in zigzag.

In order to get a further reduction of the axial dimension of the vibration damper one damping member may be formed as a ring which is mounted concentrically around the or another damping member and is separated from said other damping member by a liquid containing annular damping gap. In this case the two concentrical damping members are coupled wtih one another by the liquid contained in the damping gap. This liquid coupling may amplify the mechanical coupling, if present, between said damping members or it may be the only coupling between the damping members.

The damping effect of each damper part comprising an individual damping member is not only defined by the mass and the shape of the damping member, the size, the variation and the engagement point of the readjusting force, the shape of the damping gap between the damping member and the container of another damping member and other factors, but also by the viscosity of the liquid. That is way in some cases it is important that not all damping members are mounted in the same liquid containing container but that the liquid container of at least one damping member constitutes a damping member provided in a second liquid container. The different containers which are separated from one another may then be filled with different liquids.

The invention will be elucidated with the aid of the drawing which shows in FIGS. 1–6 axial sectional views of six differently constructed vibration dampers made in accordance with the invention.

In FIG. 1 a body of revolution spinning with great speed about its axis, for instance a turbine wheel, a gyroscope disc, a centrifuge bowl or a rapidly rotating member of another apparatus or instrument is designated by 1. The body 1 rests with a pintle 2, of which the end 3 is shaped as a portion of a sphere, in a cup-shaped socket 4 which is mounted in a first damping member 5. This damping member rests upon the upper end of a thin resilient rod 6, of which the lower end is connected to a second damping member 7 which in its turn is coupled by a somewhat thinner resilient rod 8 with a third damping member 9, the latter one resting on a still thinner resilient rod 10 which is attached to a container 11 enclosing the damping members.

From FIG. 1 it appears that all damping members 5, 7, 9 are positioned in a series along the axis of rotation of the body 1 and that the masses of the damping members 5, 7, 9 increase but the rigidity of the resilient rods 6, 8, 10 decrease in proportion as the damping members and the rods lie at a greater distance from the body of revolution. That is, the masses of the damping members increase in proportion as the damping members are more weakly coupled with the body of revolution.

The container 11 is filled with liquid 12. Each damping member 5, 7, 9, is separated from the wall of the container 11 by a gap 13, 14, 15 and in connection therewith it is observed, that the gap 13 is wider than the gap 14 and that the gap 14 is wider than the gap 15. Consequently, the vibration damper consists of three parts, each of which contains a damping member and is constructed for damping a vibration with a predetermined frequency. For damping a vibration having the lowest critical frequency the part of the damper is meant which comprises the damping member 9 and for damping the vibration having the highest critical frequency, for instance a whirl-frequency, the part comprising the damping member 5 is used.

The relative positions of the different parts of the vibration damper shown in FIG. 1 requires a relatively great axial dimension of the damper. In cases, in which there is no place for such a long vibration damper, the embodiment shown in FIG. 2 could be used.

In this embodiment the first damping member 16 hangs on thin resilient rods 17 which are connected to an annular second damping member 18 which is mounted around the pintle 2. This second damping member rests upon thin resilient rods 19 which are connected at their lower ends to an annular third damping member 20 which is also mounted around the pintle 2 and is suspended from the container 22 by thin resilient rods 21. The container is filled with liquid 23. It will be apparent that in this vibration damper, in which the series of damping members 16, 18, 20 positioned one after the other is, so to say, folded in zigzag, the different damping members are coupled with the spinning body of revolution in the same manner as those of the damper shown in FIG. 1. In this embodiment the axial dimension of the vibration damper is considerably smaller.

In the damper illustrated in FIGS. 1 and 2 the different damping members are coupled with one another, with the body of revolution 1 and with the container by the thin resilient rods, that is mechanically, only. From FIG. 3 it appears that this coupling may also be formed exclusively by the liquid 24 contained in the container 25. In this embodiment the first damping member 26 is connected to a thin resilient rod 27 which is attached to the bottom of the container 25. An annular second damping member 28 is concentrically mounted around the first damping member and separated therefrom by a narrow gap 29. This second damping member is connected with the container 25 by thin resilient rods 30. There is no mechanical coupling between the two damping members.

The embodiment shown in FIG. 4 is a combination of those shown in FIGS. 2 and 3. Therein the different damping members 16, 18, 20 are, in the same manner as in FIG. 2, mechanically coupled with one another by resilient rods 17, 19 and the damping member 16 is concentrically mounted within the annular damping member 20, so that there is also a liquid coupling between these two damping members.

Since the damping curve of each one of the different parts of the vibration damper does not depend only on the construction of the damping members, the container and the coupling between the damping members, the body of revolution and the container but also on the viscosity of the liquid, it may be advantageous to mount each damping member in its own liquid containing container. An embodiment of such a vibration damper having separated containers is illustrated in FIG. 5. In this embodiment the first damping member 31 is provided in a container 32 filled with liquid 33, said container 32 itself operating as a damping member in a second container 34 filled with liquid 35. The damping member 31 is connected to the first container 32 by a thin resilient rod 36 and the container 32 itself rests on a thin resilient rod 37 attached to the second container 33. In this case the liquids 33 and 35 may be different from one another.

Finally FIG 6 shows a gyroscope. In this gyroscope the vibration damper consists of a first damping member 38 which is kept in place in a container 40 by radially directed readjusting springs 39. The first damping member 38 carries a roller bearing 41 allowing a slight precession movement. Said damping member 38 is mounted on the shaft 42 of the gyroscope disc 43 and it is connected by means of very flexible bellows 44 to the casing 45 of the gyroscope disc. These bellows form a part of the wall of the container 40 which is filled with liquid 46. In this container there are also mounted two annular damping members 47, 48, of which the second damping member 47 is coupled by thin resilient rods 49 with the damping member 38 and the third damping member 48 is connected both by resilient rods 50 to the second damping member 47 and by resilient rods 51 to the casing 45. This vibration damper corresponds, so to its operation, with the one shown in FIG. 1. However, it differs therefrom in that the first damping member 38 is positioned at the greatest axial distance from the body of revolution, that is from the gyroscope disc.

It is observed that many combinations of the embodiments illustrated in the drawing are possible.

What I claim is:

1. A vibration damper for damping the radial vibrations of a bearing for a fast spinning body of revolution, comprising a stationary container filled with liquid, a plurality of damping masses which are each mounted for radial vibration in said container and immersed in a mass of liquid contained therein, one of said damping masses being rigidly connected with said bearing, resilient means connecting said damping masses with said stationary container, said resilient means being adapted to support the damping masses and the bearing and to oppose their radial vibrations, and means for yieldingly coupling the damping masses with one another.

2. A vibration damper as claimed in claim 1, in which the yielding coupling means are constituted by at least one resilient rod.

3. A vibration damper as claimed in claim 1, in which the yielding coupling means are constituted by a mass of liquid.

4. A vibration damper as claimed in claim 1, in which the damper parts, each of which comprising its own damping member, are constructed to work in ranges of higher frequencies the more strongly their damping members are coupled with the body of revolution.

5. A vibration damper according to claim 1, in which the axial distances between the damping members on one hand and the body of revolution on the other hand are smaller the more strongly the damping members are coupled with said body.

6. A vibration damper according to claim 1, in which the axial distances between the damping members on one hand and the body of revolution on the other hand are greater the more strongly the damping members are coupled with said body.

7. A vibration damper according to claim 1, in which at least one set of three directly consecutive damping members are provided, the axial distances between the first, and the second damping member of said set on one hand and the body of revolution on the other hand being greater and the axial distances between the second and the third damping member of said set on one hand and said body on the other hand being smaller the more strongly said damping members are coupled with the body of revolution.

8. A vibration damper according to claim 1, in which at least one set of three directly consecutive damping members are provided, the axial distances between the first and the second damping member of said set on one hand and the body of revolution on the other hand being smaller and the axial distances between the second and third damping member of said set on one hand and said body on the other hand being greater the more strongly said damping members are coupled with the body of revolution.

9. A vibration damper as claimed in claim 1, in which at least one damping member is formed as a ring which is mounted concentrically around another damping member and a liquid filled annular damping gap is provided between the two concentric damping members.

10. A vibration damper as claimed in claim 9, in which the liquid contained in said annular gap constitutes the only yielding coupling means between said two concentric damping members.

11. A vibration damper according to claim 1, comprising at least two containers each of which being filled with liquid and provided with its own damping member, one of these containers constituting at the same time the damping members of said series and said container.

12. A vibration damper for damping the radial vibrations of a bearing for a fast-spinning body of revolution, comprising: a stationary container filled with liquid; a series of at least two liquid-immersed, damping members disposed in said container on the axis of the spinning body and radially movable relative to said axis, said damping members having optimum damping action at different vibration frequencies; means rigidly connecting the first damping member of said series to the bearing; means defining a yielding coupling between each damping member and the next damping member in said series; and means counteracting radial deviations of said damping members from their neutral, non-vibrating position and supporting said damping members and the bearing, said means including resilient mechanical connecting means extending between at least one of said damping member provided in the other container.

References Cited

UNITED STATES PATENTS

| 3,091,307 | 5/1963 | Tiedemann et al. | 118—1 |
| 3,166,337 | 1/1965 | Panzer | 118—1 XR |
| 3,310,138 | 3/1967 | Reed | 118—1 XR |

FOREIGN PATENTS

| 349,906 | 5/1931 | Great Britain. |

FRED C. MATTERN, Jr., Primary Examiner

M. ANTONAKAS, Assistant Examiner

U.S. Cl. X.R.

74—5.5